A. E. WOODHOUSE.
CLUTCH.
APPLICATION FILED AUG. 26, 1918.
1,338,891.
Patented May 4, 1920.
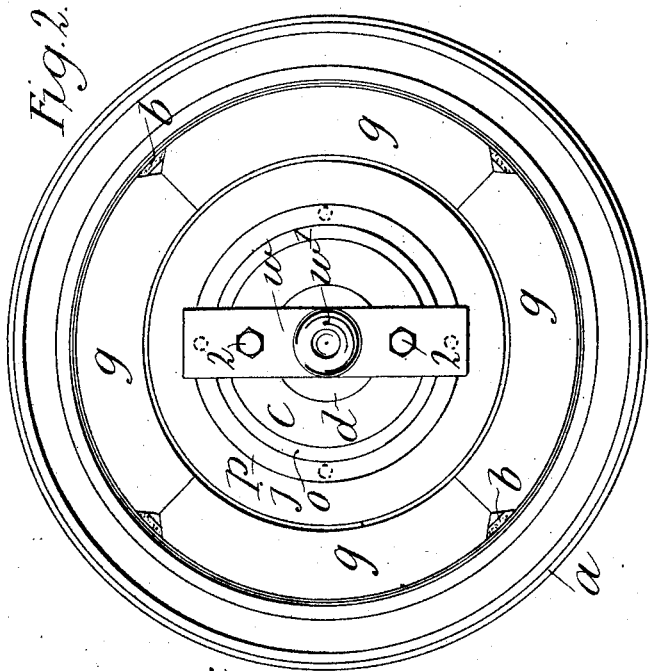
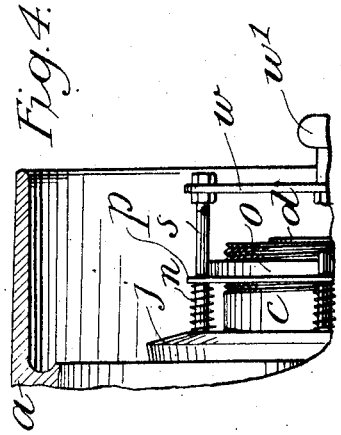
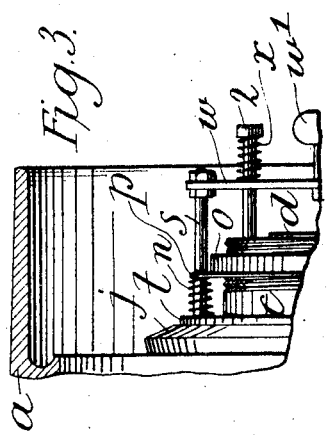
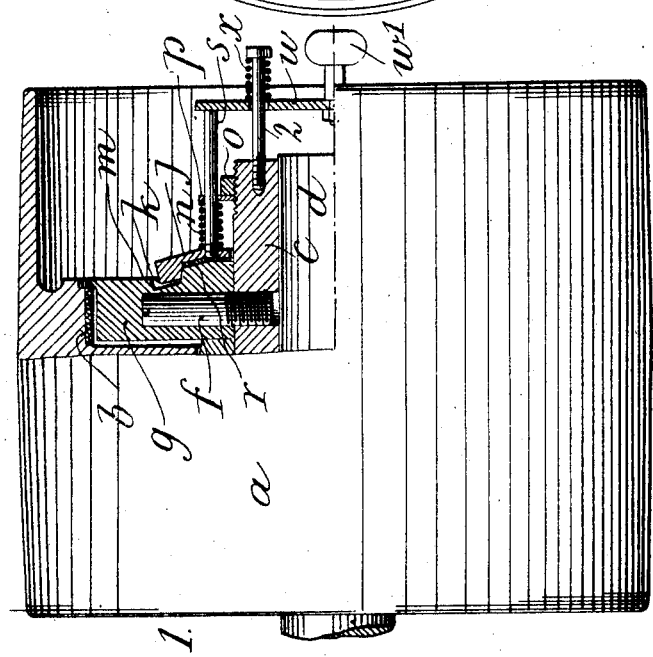

UNITED STATES PATENT OFFICE.

ALBERT ERNEST WOODHOUSE, OF WESTMINSTER, LONDON, ENGLAND.

CLUTCH.

1,338,891. Specification of Letters Patent. Patented May 4, 1920.

Application filed August 26, 1918. Serial No. 251,404.

*To all whom it may concern:*

Be it known that I, ALBERT ERNEST WOODHOUSE, a subject of the King of Great Britain and Ireland, residing at the city of Westminster, London, England, have invented Improvements in Clutches, of which the following is a specification.

This invention relates to clutches of the kind adapted to take up a load after a predetermined speed has been attained and which comprise a driving member, a member to be driven having an internal driven surface, a carrier on the driving member, devices upon the carrier capable of moving radially under centrifugal action to engage the driven member and means acting in an axial direction for restraining the radial movement of the said devices until the predetermined speed is attained. The restraining means of such clutches comprise a collar mounted to slide endwise upon the carrier and having a circumferential lip or rim adapted to co-act in known manner with recesses in the radially movable devices toward which the collar is pressed by a spring that is arranged on the carrier between the collar and an adjustable abutment nut screwed on the carrier. The carrier usually consists of a sleeve keyed on the driving shaft, and the spring, which is arranged thereon, is a coil of relatively large diameter requiring to be specially made and which is difficult to adjust to the desired small extents required for accurate automatic operation of the clutch.

The present invention has for its object to obviate this disadvantage. It also has for its object to provide improved means for preventing the clutch when desired from closing automatically when a predetermined speed has been attained, but which can after a predetermined speed has been attained, or at any other time, be operated by hand or otherwise to permit the clutch to close, so that the motor, for example an internal combustion engine, or an alternating electric current motor connected to the driving member of the clutch, can be allowed to run up to a predetermined speed without load and allowed to run free until it is desired to close the clutch, to put on the load.

For the purpose of attaining the first mentioned object, the large spring coil heretofore used around the carrier boss is according to the present invention, replaced by a number of small helical springs arranged between the adjustable nut screwed on the said carrier and the collar used to restrain the movement of the clutch devices that move radially under the action of centrifugal force. Such springs provide a greater range of adjustment and, being of small stock size, are readily obtainable through the ordinary sources of supply.

For preventing automatic closing of the clutch for the purpose set forth the spring arrangement adopted is such that the spring pressure can be adapted to prevent the restraining collar releasing the clutch devices until desired, whereupon such pressure can be reduced and the clutch devices allowed to act.

In the accompanying illustrative drawings Figure 1 shows partly in central longitudinal section and partly in side elevation, a clutch embodying the invention.

Fig. 2 shows the clutch in end elevation.

Figs. 3 and 4 are detail views illustrating modifications.

The clutch illustrated in Fig. 1 comprises a pulley $a$ to be driven, having an inner cylindrical surface preferably lined with Ferodo fiber $b$, a carrier in the form of a sleeve $c$ fixed upon the driving shaft $d$ and provided with radially projecting pins $f$ and clutch segments $g$ that are mounted on the pins $f$ and can slide radially outward under the influence of centrifugal force to engage the lining $b$ and close the clutch so as to drive the pulley $a$. The sleeve $c$ serves also as a bearing for the pulley $a$ which is free to turn thereon but is prevented from moving endwise. To prevent the segments $g$ from moving radially outward until a certain predetermined speed is attained there is provided a restraining collar $j$ mounted to slide endwise on the sleeve $c$ and having a circumferential lip $k$ adapted to coact in the known way with recesses $m$ in the segments $g$, the said collar $j$ being, according to the present invention, urged toward the segments $g$ by a number of small springs $n$. $o$ is an endwise adjustable nut or collar screwed on the sleeve $c$ and which through an interposed ring $p$, forms an abutment for the said springs $n$. The springs $n$ in the example encircle pins $s$ that are spaced apart around the sleeve $c$ and extend freely through holes in the ring $p$ against which the outer ends of the springs $n$ bear so that the springs can press the collar $j$ against the segments $g$ with a definite force. $r$ is an oil pad arranged between the segments $g$ and the collar $j$ to reduce wear between these parts.

With the parts constructed and arranged as described when the clutch is open and therefore not driving, the relationship of each segment $g$ to the collar $j$ is that shown in Fig. 1, each member $g$ being engaged by the lip or flange $k$ of the collar $j$. In this position, when the driving shaft $d$ is running and the critical speed for which the clutch has been adjusted by means of the nut $o$ and springs $n$ is slightly exceeded, the segments $g$, under the action of centrifugal force will force back the collar $j$ against the action of the springs $n$ and bear against the lining $b$ so as to drive the pulley $a$ from the sleeve $c$ and shaft $d$.

By adjusting the position of the nut $o$ on the sleeve $c$ and thereby altering the pressure exerted by the springs $n$ on the restraining collar $j$, the speed at which the clutch will automatically close can be varied.

To enable the clutch to be held out of action so that it can be permitted to close only when required, there is associated with the springs $n$ and their pins $s$ in the examples shown, an axially movable controlling member $w$, shown as in the form of a transversely arranged plate adapted to be moved axially, as for instance by hand, as by a pull handle $w^1$, or it may be by other means, whereby the action of the said springs on the restraining collar $j$ can be varied.

In the example shown in Fig. 1, the inner end of the pins $s$ are fixed to the restraining collar $j$ while their outer end portions extend freely through the ring $p$. The pins $s$ in this example form stops for the plate $w$ which is mounted to move toward and from the sleeve $c$ and is forced against the pin ends by auxiliary springs $x$. These springs are arranged on bolts 2 fixed to the sleeve $c$ and on which the plate $w$ is mounted to slide toward and from the sleeve $c$. The arrangement is such that the pressure of the auxiliary springs $x$ in conjunction with that of the springs $n$ is such as to prevent outward movement of the collar $j$ to release the radially movable segments $g$ upon the normal predetermined speed being attained but by moving the plate $w$ outwardly by hand or other means, away from the pins $s$ against the action of the auxiliary springs $x$, the spring pressure on the collar $j$ can be reduced sufficiently to enable the collar to be moved backward by the pressure thereon of the segments $g$ so as to release the segments and enable them to fly out and effect the clutching, assuming the speed of the shaft $d$ to have attained or exceeded that for which the main springs $n$ have been adjusted.

In the example shown in Fig. 3, the inner ends of the pin $s$ are secured to a ring $t$ arranged normally to bear against the restraining collar $j$ and to slide endwise on the carrier $c$. In this example the outer ends of the pins are secured to the plate $w$, so that when the handle $w^1$ is pulled, it will pull back the ring $t$ against the action of the springs $n$ and $x$, thereby removing all spring restraining pressure upon the centrifugal segments $g$ and thus releasing them.

Instead of using auxiliary springs $x$, the same result can advantageously be attained by securing the outer ends of the pins $s$ to the movable plate $w$, as shown in Fig. 4, and adjusting the abutment nut $o$ to place the desired extra compression on the springs. As in the last arrangement, the radially movable segments $g$ are free to fly outwardly under centrifugal force when the movable plate $w$ is pulled or moved outwardly against the action of the said springs.

It will thus be understood that with each of the arrangements hereinbefore described, when it is desired that the clutch shall not act automatically, the springs $n$ are compressed by the nut $o$ and abutment ring $p$ sufficiently to prevent, either in conjunction with the auxiliary springs $x$ (Figs. 1, 2 and 3), or alone, as in Fig. 4, the radially movable segments $g$ from moving outward until the plate $w$ is moved backward axially by hand or otherwise. When the clutch is desired to act automatically at a predetermined speed, the springs $n$ are compressed only to the degree necessary to permit them, and the springs $x$ if used, to yield when the predetermined speed is attained.

As will be understood, the details of construction of the clutches can be varied without departure from the invention.

What I claim is:—

1. In a clutch comprising a member to be driven, a driving member, a carrier on said driving member, clutch devices upon said carrier capable of moving under centrifugal action to engage the member to be driven and means acting in an axial direction to restrain the outward movement of said clutch devices, means for controlling said restraining means, comprising an abutment device mounted on said carrier, a plurality of longitudinal pins arranged around said carrier and supported by said abutment device and a plurality of coiled springs each surrounding one of said pins and located between the restraining means and said abutment device and adapted to exert endwise pressure on the former.

2. In a clutch comprising a member to be driven, a driving member, a sleeve on said driving member, clutch devices upon said sleeve capable of moving under centrifugal action to engage the member to be driven and a collar mounted to slide on said sleeve and adapted to engage said clutch devices and restrain them from moving outwardly, an abutment device on said sleeve, longitudinal pins spaced around said sleeve, supported at their inner ends and extending outwardly through said abutment device and springs mounted on said pins so as to re-act between the abutment device and restraining collar.

3. In a clutch comprising a member to be driven, a driving member, a sleeve on said driving member, clutch devices upon said sleeve capable of moving under centrifugal action to engage the member to be driven and a collar mounted to slide on said sleeve and adapted to engage such clutch devices and restrain them from moving outwardly, an axially adjustable abutment device on said sleeve, a number of axially movable pins spaced apart around said sleeve, said pins being supported at their inner ends and extending through holes in the abutment device and a number of springs carried by said pins and adapted to re-act between said abutment device and said restraining collar.

4. In a clutch comprising a member to be driven, a driving member, a sleeve on said driving member, clutch devices upon said sleeve capable of moving under centrifugal action to engage the member to be driven and a collar mounted to slide on said sleeve and adapted to engage such clutch devices and restrain them from moving outwardly, an axially adjustable abutment device on said sleeve, a number of axially movable pins spaced around said sleeve and connected at their inner ends to said restraining collar and extending outwardly through said abutment device and coiled springs carried by said pins and adapted to re-act between said restraining collar and abutment device.

5. In a clutch of the kind comprising a rotary driven member, a rotary driving member, a carrier driven by said driving member, clutch devices mounted on said carrier and capable, under the action of centrifugal force, of engaging said driven member, and a collar mounted to slide on said carrier and adapted to engage said clutch devices and restrain them from moving outwardly until it is moved backward, an abutment device on said carrier, a number of coiled springs arranged around said carrier between said restraining collar and abutment device and acting to force the restraining collar against said clutch devices, means supporting said springs in position and means associated with said spring supporting means whereby the spring pressure on said restraining collar can be varied by axial movement of said spring supporting means.

6. In a clutch of the kind comprising a rotary driven member, a rotary driving member, a carrier driven by said driving member, clutch devices mounted on said carrier and capable, under the action of centrifugal force, of engaging said driven member, and a collar mounted to slide on said carrier and adapted to engage said clutch devices and restrain them from moving outwardly until it is moved backward, an abutment device on said carrier, a number of coiled springs arranged around said carrier between said restraining collar and abutment device and acting to force the restraining collar against said clutch devices, pins extending through and supporting said springs in position and means associated with said pins whereby the spring pressure on said restraining collar can be varied by axial movement of said pins.

7. In a clutch of the kind comprising a rotary driven member, a rotary driving member, a carrier driven by said driving member, clutch devices mounted on said carrier and capable, under the action of centrifugal force, of engaging said driven member, and a collar mounted to slide on said carrier and adapted to engage said clutch devices, and restrain them from moving outwardly until it is moved backward, an abutment device on said carrier, a number of coiled springs arranged around said carrier between said restraining collar and abutment device and acting to force the restraining collar against said clutch devices, pins extending through said abutment device and supporting said springs in position and an endwise movable member adapted to act upon the outer end portions of said pins and control the movement of said pins.

8. In a clutch of the kind comprising a rotary driven member, a rotary driving member, a carrier driven by said driving member, clutch devices mounted on said carrier and capable, under the action of centrifugal force, of engaging said driven member, and a collar mounted to slide on said carrier and adapted to engage said clutch devices and restrain them from moving outwardly until it is moved backward, an abutment device on said carrier, a number of coiled springs arranged around said carrier between said restraining collar and abutment device and acting to force the restraining collar against said clutch devices, pins extending through said abutment device and supporting said springs in position, a transverse member associated with the outer ends of said pins, supporting means for said member and auxiliary springs arranged to act against said member and assist in forcing said restraining collar against said clutch devices, said transverse member being capable of axial movement to vary the spring pressure on said collar.

9. In a clutch of the kind comprising a rotary driven member, a rotary driving member, a carrier driven by said driving member, clutch devices mounted on said carrier and capable, under the action of centrifugal force, of engaging said driven member, and a collar mounted to slide on said carrier and adapted to engage said clutch devices and restrain them from moving outwardly until it is moved backward, an abutment device on said carrier, a number of coiled springs arranged around said carrier between said restraining collar and abutment device and acting to force the restraining collar against said clutch devices, pins extending through and supporting said springs in position, a transverse plate associated with the outer ends of said pins, headed guide pins on which said plate can move in an axial direction, auxiliary springs surrounding said guide pins between said plate and the heads of said pins and acting against said plate to assist in forcing said restraining collar against said clutch devices and means for withdrawing said plate against the action of said auxiliary springs.

10. In a clutch of the kind comprising a rotary driven member, a rotary driving member, a carrier driven by said driving member, clutch devices mounted on said carrier and capable, under the action of centrifugal force, of engaging said driven member, and a collar mounted to slide on said carrier and adapted to engage said clutch devices and restrain them from moving outwardly until it is moved backward, an abutment device on said carrier, a number of coiled springs arranged around said carrier between said restraining collar and abutment device and acting to force the restraining collar against said clutch devices, pins extending through and supporting said springs in position and fixed to said collar, a transverse plate bearing against the outer ends of said pins, guide pins on which said plate can move in an axial direction, auxiliary springs surrounding said guide pins between said plate and heads on said pins and acting against said plate and means for moving said plate axially in opposition to said auxiliary springs.

Signed at London, England, this 25th day of July, 1918.

ALBERT ERNEST WOODHOUSE.